3,212,936
METHOD OF FORMING PASTE-FORM FUEL CELL ELECTRODE

James E. McEvoy, Morton, and Harold Shalit, Drexel Hill, Pa., assignors, by direct and mesne assignments, of one-half to Air Products and Chemicals Inc., a corporation of Delaware, and one-half to Northern Natural Gas Company, Omaha, Nebr., a corporation of Delaware
No Drawing. Filed Nov. 7, 1960, Ser. No. 67,467
12 Claims. (Cl. 136—120)

This invention relates to fuel cells in general, and is particularly concerned with a novel electrode material which may be suitably employed in the anode and/or cathode. The invention is concerned specifically with improvements in the production of catalytic electrodes and the improved electrodes obtained thereby particularly suited for the electro-chemical oxidation of suitable fuels in a fuel cell.

In our co-pending application, Serial No. 67,521, filed of even date herewith, now Patent No. 3,097,974, we have described a novel fuel cell electrode utilizing an improvement whereby a porous catalytic electrode comprising a solid matrix structure containing finely divided, high surface area, activated carbon impregnated with a noble metal catalyst is employed in fuel cell operation. The types of fuels generally applicable are hydrogen, hydrocarbons, alcohols, carbonyl compounds, and the like. It is further contemplated that the fuel cells of this invention as well as those of the above identified application are to operate on similar fuels at relatively low temperatures, that is, well below 500° F. and preferably at temperatures not exceeding 300° F. While the electrode of the above identified application particularly concerns supported noble metal catalyst, the present invention is of broader scope and contemplates the use of the transition metals as the catalytic agents.

In accordance with the present invention fuel cell electrodes are prepared by distributing one or more of the transition metals in and on porous activated carbon powder initially having a surface area of at least 50, and preferably 600 or more square meters per gram. The amount of transition metal component constitutes 0.1 to 30% by weight based on the metal-carbon combination. The metal-carbon composition is thereafter formed into a homogeneous pasty condition by admixture with a fluid electrolyte in an amount ranging from that sufficient only to completely wet the surface of the metal-carbon mixture to an amount such that the paste has a semi-fluid physical form. Generally, these pastes may be considered as having "hard" to "soft" consistency as understood in the preparation of pastes in the ceramic art. Such paste constitutes the catalytic portion in association with suitable electronic conductor means forming the electrode.

The activated carbon herein contemplated has a physical form of considerable fineness such that in its finely divided state it will pass completely through a 200 mesh sieve, U.S. Standard, and at least 90% will pass through a sieve of 300 mesh, U.S. Standard. The surface area of such activated carbon is high, possibly as high as 1000 or more square meters per gram.

The association of the catalytic metal component with the carbon may be effected in a variety of suitable ways. A simple procedure possible with most of the preferred transition metals is that of adsorbing on the surface of the activated carbon a suitable solution of a compound or compounds containing the desired amount of the metal component, such compounds characterized in being relatively readily decomposed to the metal, such as by low temperature thermal decomposition or reduction, as with hydrogen or other suitable reducing agent. Reduction is generally preferable because of the ease of treatment coupled with high quality of product. Other methods may be employed without, however, necessarily achieving the degree of quality obtained by the procedures just described.

The carbon with the metal component added thereto is freed, if necessary, of any extraneous components in order to leave substantially only carbon with the associated metal. In the system in which impregnation of the carbon is employed, this might entail, for example, reduction of the metal-containing compound by treatment with hydrogen at ambient or moderate elevated temperatures, such as at about 150–200° F., either before or after removal of excess solvent of the solution. The preferred method of obtaining the metal component in the active form is to effect the decomposition of the adsorbed metal-containing compound after formation of the paste and when the paste is in its proper place in the fuel cell. Under such conditions a suitable reducing medium, such as hydrogen or methanol, may be employed to effect the activation.

The carbon containing the associated catalytic metal component is converted into a paste, with or without intervening drying of adsorbed liquid, by thorough admixture with a suitable electrolyte. Depending on the nature of the system in which the electrode is scheduled for actual fuel cell operation the paste-forming electrolyte may be appropriately either basic or acidic. A typical fuel cell operating with a concentrated alkali metal hydroxide electrolyte would advantageously utilize as the additive in the paste electrode, in either or both the anode and cathode capacity, an aqueous solution of potassium hydroxide, for instance 30–40% KOH. For use in sulfuric acid electrolyte cells a reasonably concentrated sulfuric acid medium may be employed to form the paste. Preferably, the electrolyte employed in forming the paste is similar in composition to the electrolyte of the fuel cell in which the electrode is employed. In any event the electrolyte of the paste and the electrolyte of the cell are mutually compatible and function without detriment to the overall operation of the fuel cell. Naturally it is a requirement of the system that the catalytic metals thus employed are resistant to chemical change through attack of the paste-forming medium both prior to and during actual electro-chemical operation. Such metals in addition are substantially stable against attack by the fuel and/or oxidizing gas encountered in the fuel cell operation.

Several forms of structure adapt themselves readily to the utilization of the paste-form catalyst of these electrodes. For example, a possible form of electrode constitutes the paste-like material, with suitable associated high-conductivity material such as wire or carbon conductors, encapsulated or retained by a porous membrane or other ionic and electrolytic transfer medium which serves to hold the electrode paste in position while giving access simultaneously to the electrolyte for ionic transfer. The paste-form catalytic material is likewise well suited for use in the fuel cell of the type in which the anode and cathode are juxtaposed to an ion-exchange membrane serving as the electrolyte.

Certain considerable advantages accrue to fuel cell systems in which this non-rigid electrode material is employed. With the present non-rigid material its shaping to meet various space requirements is readily effected. In addition, certain marked advantages of fabrication and use of fuel cells are obtained. In handling the paste-form material for introducing and/or replacing the material as occasion may demand during original construction or in replacement operations, working space requirements may be beneficially modified. In addition to the practical advantages and certain definite advantages in the manipulative operations, the high order of activity obtained with very thin layers of these new electrode systems is an advance of no small degree in the art.

In multicell systems, facile construction is particularly noted in that the alternate layers of cathode, spacing agent, electrolyte, anode, spacing agent are easily fabricated through application of the cathode and anode composites in thin pasty layers with remarkably efficient contact at the electrolyte-electro-chemical-conductor boundaries as well as the advantageously high catalyzing efficiency inherent in this composition. There is also the attendant ease of supplying fuel and oxygen to the proper areas by manifolding, and the serial electrical connections are readily fabricated. Another definitely advantageous system employing paste-electrodes is that of the "dry" system in which the paste-electrodes may constitute either or both anode and/or cathode with a thin separating area comprising the electrolyte. While these "dry" fuel cell components, which may utilize, for example, fuel delivered from a saturated wick or absorptive matrix and merely the surrounding air as the oxidizing agent, are discharged after a finite period of current production, they may be recharged by the presentation of new fuel sources to the system and/or under suitable conditions may have an indefinite storage life activated only upon introduction of the fuel to the wicking or similar device.

Electrodes made in accordance with the invention were experimentally evaluated as fuel electrodes for the electro-chemical oxidation of methanol at 55° C. In order to eliminate uncontrolled variables which conceivably could mask the actual performance obtained from the fuel electrodes a half-cell electrode test unit was employed. The fuel electrode to be tested was opposed by a platinum cathode, both immersed in a 34% aqueous KOH electrolyte, and an external source of current was supplied to the platinum cathode. This measured current, representing the total electrode current, is then related to the oxidation potential of the fuel electrode in reference to a mercury-mercuric oxide electrode which is used as reference electrode. The experimental data indicating the performance of the electrodes tested, in terms of E.M.F. versus current density, are given in the examples and tables below.

EXAMPLE I

Activated carbon having a surface area of about 1000 square meters per gram, commercially available Darco G–60, was impregnated with an aqueous solution of palladium chloride to deposit in and on the carbon the equivalent of 20 weight percent palladium as metal. Sufficient water was present in the solution to form a slurry comprising the carbon during the impregnation. The slurry was neutralized to approximately pH 7 with sodium acid carbonate and then permitted to age for about 24 hours. This aged material was then separated from any excess solution by filtration, and the filter cake was water washed with distilled water until the recovered wash water tested substantially free of sodium. The moist filter cake was dried and then thoroughly admixed with sufficient 34% potassium hydroxide solution (aqueous) to form a moderately soft paste which was placed in a hollowed-out porous carbon block and capped with a porous carbon cover. This was tested and the test results appear in Table 1 with the current density reported in milliamperes per square centimeter of cross-sectional area of the paste.

Table 1
FUEL: METHANOL @ 55° C.

[Electrode containing 20 wt. percent palladium on Darco G–60; pasted with 34% KOH]

| E.M.F., volts vs. HgO: | Current density, ma./cm.$^2$ |
|---|---|
| 0.80 | Open circuit |
| 0.62 | 50 |
| 0.52 | 100 |
| 0.43 | 150 |

The above data illustrates the high order of effectiveness of this material in a test cell constructed at less than optimum configuration. While it has been indicated that the catalysts of the invention comprise from 0.1 to 30 wt. percent of the transition metal support on carbon, it is to be understood that catalyst cost plays a part in the selection of the quantities of metals so employed. The use of relatively small amounts of some catalytic agents, such as in order of 2.0 to 5.0 wt. percent platinum, gave results of such high order that use of additional quantities, even though achieving a small increase in the effective production of electric current, achieved such increase in production at a rate so small in comparison to the increase in quantities of expensive metal that large quantities of such electrode components are economically unsound. For example, highly active platinum black formed into a paste with 34% KOH forms an effective electrode without contributing sufficient extra outstanding qualities justifying the additional expenditure for the catalyst metal over and above that exhibited at lower concentrations. This is illustrated in Table 2.

Table 2
FUEL: METHANOL @ 55° C.

[Electrode containing 100 wt. percent platinum black; pasted with 34% KOH]

| E.M.F., volts vs. HgO: | Current density, ma./cm.$^2$ |
|---|---|
| 0.84 | Open circuit |
| 0.68 | 50 |
| 0.60 | 100 |
| 0.53 | 150 |

The effectiveness of lower quantities of catalytic metal distributed on the carbon and then admixed with the electrolyte is illustrated in Table 3.

Table 3
FUEL: METHANOL @ 55° C.

[Electrode containing 2.0 wt. percent palladium on activated carbon, 1000 sq. m./g.; pasted with 34% KOH]

| E.M.F., volts vs. HgO: | Current density, ma./cm.$^2$ |
|---|---|
| 0.80 | Open circuit |
| 0.64 | 40 |
| 0.54 | 90 |

As is shown above the polarization effect during current drain is relatively low. The life expectancy is relatively high in that the electrode of Table 1 is operated for 175 hours at a current density of 130 ma./cm.$^2$ with a polarization change of only 0.11.

EXAMPLE II

A paste electrode prepared as in Example I differing in that nickel is the catalytic metal, rather than palladium, comprising 20% by weight of the carbon-metal components. Upon testing, the E.M.F. volts, related to the mercuric oxide electrode, is 78 in open circuit and at a current density, ma./cm.$^2$, of 88 is 0.57. A simliar paste electrode using cobalt instead of nickel is only slightly less effective upon testing.

Obviously, many modifications and variations of the present invention as hereinbefore set forth may be made without departing from the spirit and scope thereof and therefore only such limitations should be imposed as are indicated in the appended claims.

What is claimed is:

1. The method of forming a fuel cell electrode utilizable for the electrochemical oxidation of liquid fuel which comprises the steps of: distributing transition metal upon porous activated carbon powder having an initial surface area of from 50 to above 1000 sq. m./g. in an amount constituting 0.1 to 30 wt. percent of the total metal-carbon composition; forming the metal-carbon composition into a homogeneous paste by admixture with a liquid electrolyte, similar to and compatible with the electrolyte with which the electrode is to be employed, supplied in an amount ranging from that sufficient only to completely wet the surface of the metal-carbon mixture to an amount forming a semi-fluid paste, said paste constituting a catalytic electrode portion; associating said catalytic electrode paste with means adapted to support and hold the electrode paste in its desired shape and position in the fuel cell, said supporting and holding means being capable of ionic and electrolytic transfer between the catalytic paste material and the fuel cell electrolyte; and associating said paste with electronic conductor means to form the electrode.

2. The method as in claim 1 in which said active carbon powder has an initial surface area of 600 to above 1000 sq. m./g.

3. The method as in claim 1 in which said transition metal is distributed upon said activated carbon by adsorption of a solution of one or more decomposable compounds of transition metals and in which said one or more decomposable compounds are decomposed to the metal form by chemical reduction with a reducing agent at a temperature between ambient temperature and about 200° F.

4. The method as in claim 3 in which said reducing agent is hydrogen.

5. The method as in claim 3 in which said reducing agent is methanol.

6. The method as in claim 3 in which said reducing agent is hydrogen.

7. The method as in claim 3 in which said one or more transition metals comprises palladium, and said electrolyte is an aqueous solution of an alkali metal hydroxide.

8. The method as in claim 7 in which said alkali metal hydroxide is potassium hydroxide.

9. The method as in claim 8 in which said palladium is distributed upon said activated carbon powder by impregnation of the carbon with sufficient aqueous solution of palladium chloride to form a slurry, the slurry is neutralized to about pH 7 and aged for about 24 hrs., the impregnated carbon material is freed of excess liquid by filtration and then washed free of deleterious components of the neutralizing agent, and the moist filter cake is dried before admixture with the potassium hydroxide solution to form said paste; and in which said supporting and holding means for said paste is a solid carbon electrode support having a hollow portion adapted to retain said paste of catalytic material.

10. The method as in claim 3 in which said supporting and holding means comprises a semi-permeable ion exchange membrane.

11. The method as in claim 10 in which said membrane encapsulates said catalytic paste material.

12. The method as in claim 1 in which said liquid fuel is methanol.

References Cited by the Examiner

UNITED STATES PATENTS

| | | | |
|---|---|---|---|
| 2,384,463 | 9/45 | Gunn et al. | 136—86 |
| 2,925,454 | 2/60 | Justi et al. | 136—86 |
| 3,062,908 | 11/62 | Salkind | 136—27 |
| 3,067,273 | 12/62 | Duddy | 136—27 |
| 3,121,031 | 2/64 | Gruneberg et al. | 136—86 |

FOREIGN PATENTS

| | | |
|---|---|---|
| 206,025 | 11/59 | Austria. |
| 233,847 | 5/61 | Australia. |
| 199,736 | 6/23 | Great Britain. |

JOHN H. MACK, *Primary Examiner.*

JOSEPH REBOLD, JOHN R. SPECK, *Examiners.*